United States Patent [19]

O'Neil-Bell

[11] Patent Number: 5,279,625
[45] Date of Patent: Jan. 18, 1994

[54] METHOD OF CLOSING ONE END OF THE CASE OF SODIUM/SULPHUR CELL AND A SODIUM/SULPHUR CELL PRODUCED BY THIS METHOD

[75] Inventor: Christopher O'Neil-Bell, Warrington, United Kingdom

[73] Assignee: Chloride Silent Power, Ltd., Runcorn, United Kingdom

[21] Appl. No.: 793,398
[22] PCT Filed: Jul. 24, 1990
[86] PCT No.: PCT/GB90/01136
§ 371 Date: Jan. 15, 1992
§ 102(e) Date: Jan. 15, 1992
[87] PCT Pub. No.: WO91/01571
PCT Pub. Date: Feb. 7, 1991

[30] Foreign Application Priority Data

Jul. 25, 1989 [GB] United Kingdom ............ 8917022

[51] Int. Cl.$^5$ .......................................... H01M 10/38
[52] U.S. Cl. .......................................... 29/623.4; 429/104
[58] Field of Search ................ 429/104; 29/623.4

[56] References Cited

U.S. PATENT DOCUMENTS

| | | |
|---|---|---|
| 3,294,591 | 12/1966 | Jordan . |
| 3,306,488 | 2/1967 | Lemelson . |
| 3,841,912 | 10/1974 | Kagawa et al. ............... 429/104 |
| 4,027,075 | 5/1977 | Nakabayashi et al. ............... 429/104 |
| 4,048,393 | 7/1977 | Heintz et al. . |
| 4,332,868 | 6/1982 | Anand et al. ............... 429/104 X |
| 4,413,043 | 11/1983 | Steinlettner et al. ............... 429/104 |

FOREIGN PATENT DOCUMENTS

| | | |
|---|---|---|
| 0184299-A1 | 5/1986 | European Pat. Off. . |
| 8600472.7 | 6/1987 | Fed. Rep. of Germany . |
| 1038543 | 9/1953 | France . |
| 61-138473A | 6/1986 | Japan . |
| 63-62165 | 3/1988 | Japan . |
| 1176488 | 1/1970 | United Kingdom . |
| 1344565 | 1/1974 | United Kingdom . |
| 1534799 | 12/1978 | United Kingdom . |
| 2005908B | 3/1982 | United Kingdom . |
| 2083686 | 3/1982 | United Kingdom . |
| 2097574B | 11/1984 | United Kingdom . |

Primary Examiner—Stephen Kalafut
Attorney, Agent, or Firm—Finnegan, Henderson Farabow, Garrett & Dunner

[57] ABSTRACT

A sodium/sulphur cell includes a case and a closure member. Each of the case and the closure member is formed of a composite material consisting of a substrate and a deformable metal layer mechanically fixed to the substrate. The substrate is formed of a material which is harder than the deformable metal. An outwardly extending annular flange is formed at the open end of the case. The closure member is secured to the annular flange by a solid phase bond thereby to close the case.

10 Claims, 3 Drawing Sheets

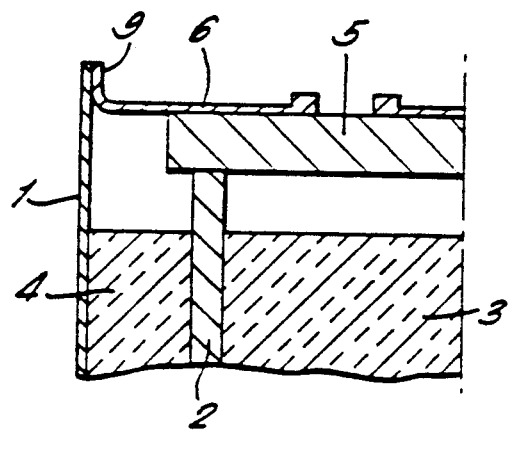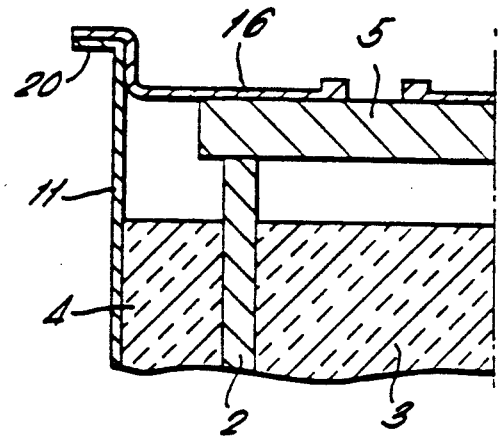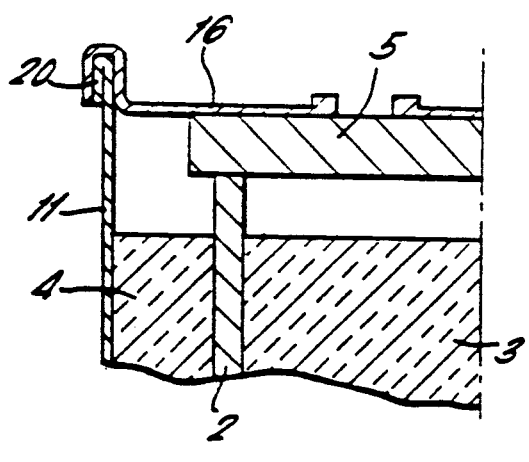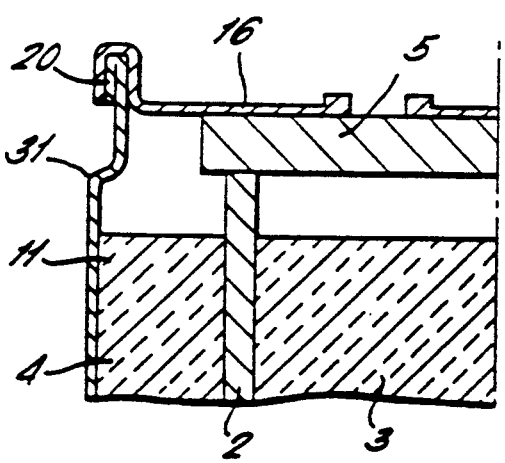

METHOD OF CLOSING ONE END OF THE CASE OF SODIUM/SULPHUR CELL AND A SODIUM/SULPHUR CELL PRODUCED BY THIS METHOD

This invention relates to a sodium/sulphur cell, and in particular to a method of closing the case of a sodium/sulphur cell.

Unlike conventional lead acid batteries in which a liquid electrolyte—dilute sulphuric acid—separates two solid electrodes, in a sodium/sulphur cell a solid electrolyte—generally beta alumina—separates two liquid electrodes, namely liquid sulphur and liquid sodium electrodes.

Figure 1:
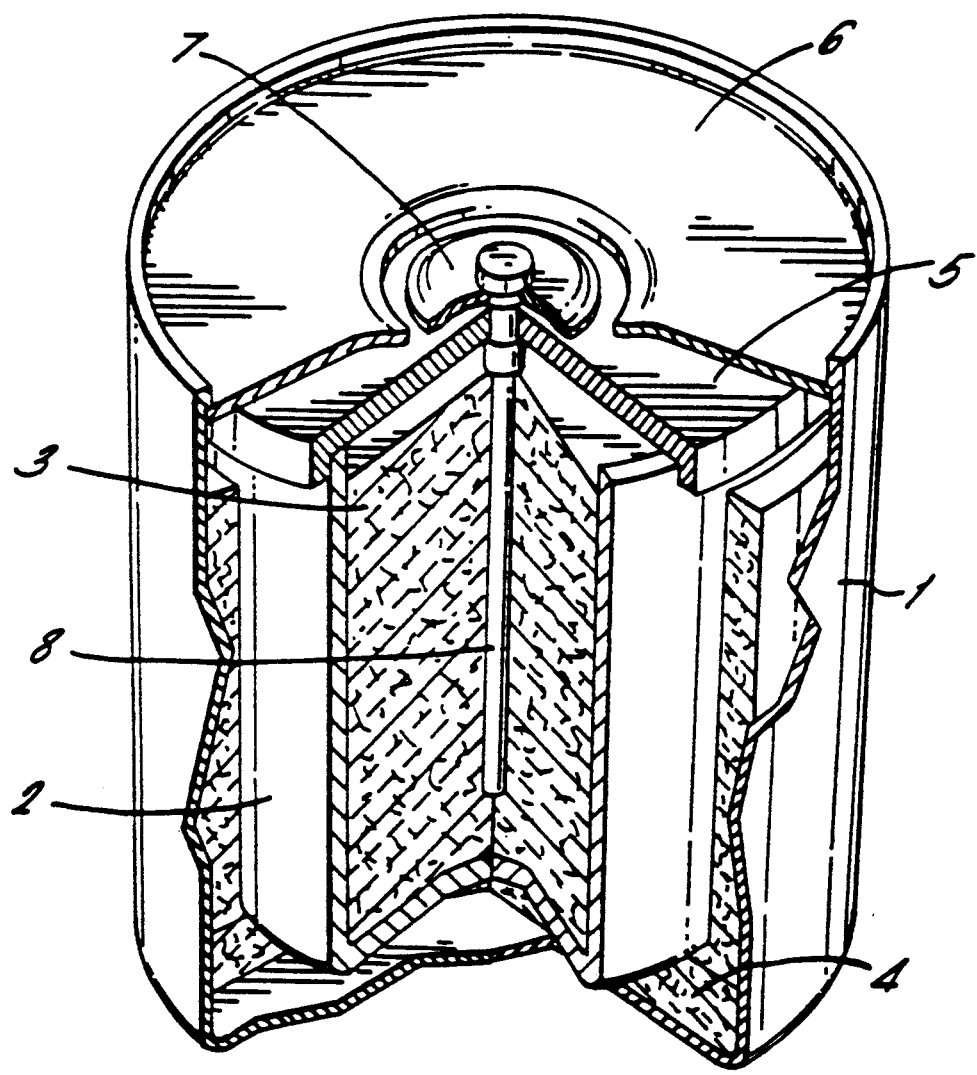

Such a sodium/sulphur cell is shown in FIG. 1 of the drawings which is a perspective view of the cell with part broken away.

As shown the cell comprises a case 1 of, for example steel with an internal anti-corrosion coating of aluminium or aluminium alloy, in the form of a right circular cylinder and containing a solid electrolyte cup 2 of beta alumina, the cup 2 containing a sodium electrode 3, while a space between the case 1 and the cup 2 contains a sulphur electrode 4. For use, the cell is maintained at a temperature of between 300° C. and 400° C. such that the sodium and sulphur electrodes 3 and 4 are in liquid form.

The open end of the cup 2 is closed by an insulating disc 5 of alpha alumina, while the case 1 is closed by an annular sealing closure disc 6 of steel again with an internal anti-corrosion coating of aluminium or aluminium alloy.

The case 1 serves as a terminal for the sulphur electrode 4, while the sodium electrode 3 contains an elongate metal current collector 8 which extends axially of the case 1 out through the disc 5 where it is connected to a centre terminal disc 7 mounted on the disc 5, the necessary connections being made by welding.

As sulphur is essentially non-conducting a means of making an electrical connection between the case 1 and the cup 2 has to be provided, and this is generally achieved by forming the sulphur electrode 4 as a carbon fibre mat impregnated with sulphur.

It will be appreciated that with such a cell the sodium and sulphur electrodes 3 and 4 can have their locations reversed.

With such a cell it is necessary for the alpha alumina disc 5 to seal the open end of the beta alumina cup 2 and this is generally effected by a glazing technique. It is also necessary for the disc 6 and the terminal disc 7 to be secured to the alpha alumina disc 5 to form seals, and since alpha alumina is both ionically and electronically insulating diffusion bonding is generally used.

It is also necessary for the disc 6 to be secured to the case 1, and this is generally affected using electron beam, laser or TIG fusion welding techniques.

However, a difficulty which arises when using such techniques is that the heat required can damage the corrosion resistant coating provided on the case 1 and on the closure disc 6, or can create a heat affected zone in the weld region, either of which can result in a more rapid than usual localised degradation in the cell due to corrosive attack by the cell electrode materials. Generally, it has been found difficult to produce a hermetic bond between the case and the closure member of prior are sodium/sulphur cells.

According to the present invention there is provided a method of closing the case of a sodium/sulphur cell by securing a closure member to the case, each of the case and the closure member being formed of a composite material consisting of a metal substrate and a deformable metal layer mechanically fixed to said substrate, said substrate being formed of a material which is harder than said deformable metal, the method comprising the steps of forming an outwardly extending annular flange at the open end of the case and securing the closure member to the annular flange by solid phase bonding thereby to close the case.

The provision of an outwardly extending annular flange at the open end of the case has at least two advantages, as follows 1) The closure member is secured to the case at a region which is nor in contact with the electrode materials. Accordingly, any damage or weakening of the case or the closure member caused by the process of securing the case and the closure member together is not exacerbated by corrosive attack by the cell electrode materials.

2) The pressure which has to be applied during the process of securing the case and closure member together can be applied axially. The combination of possibility of applying pressure axially and the use of a composite material including a deformable metal layer for the case and closure member allow the case and the closure member to be secured together by solid phase bonding. In this way an annular hermetic seal can be produced between the case and the closure member.

Preferably after securing of the closure member to the annular flange, the annular flange and the part of the closure member secured thereto are bent to extend about the outside of the case with the free edges of the annular flange and the closure member directed away from the end of the case closed by the closure member.

Preferably the case is kinked inwardly below the position of the free edges of the annular flange and the closure member such that the overall diameter of the cell is no more than the basic diameter of the case.

The closure member can be secured to the annular flange by any one of a number of methods of solid phase bonding such as ultrasonic welding, high speed diffusion bonding (thermo-compression) and cold welding.

According to a second aspect of the present invention there is provided a sodium/sulphur cell including a case closed at one end by a closure member, each of the case and the closure member being formed of a composite material consisting of a substrate and a deformable metal layer mechanically fixed to said substrate, said substrate being formed of a material which is harder than said deformable metal, said one end of said case being formed to include an outwardly extending annular flange and the closure member being secured to said annular flange by a solid phase bond.

In a sodium/sulphur cell provided in accordance with the present invention, the regions of the case and the closure member secured together by the solid phase bond are not in contact with the electrode materials of the cell. Accordingly, any damage or weakening of the case or the closure member is not exacerbated by corrosive attack by the electrode materials of the cell.

Preferably the annular flange and the part of the closure member secured thereto are bent to extend about the outside of the case with the free edges of the annular flange and the closure member directed away from said one end of the case.

Preferably, the case is kinked inwardly below the position of the free edges of the annular flange and the closure member such that the overall diameter of the cell is no more than the basic diameter of the case.

Figure 4:
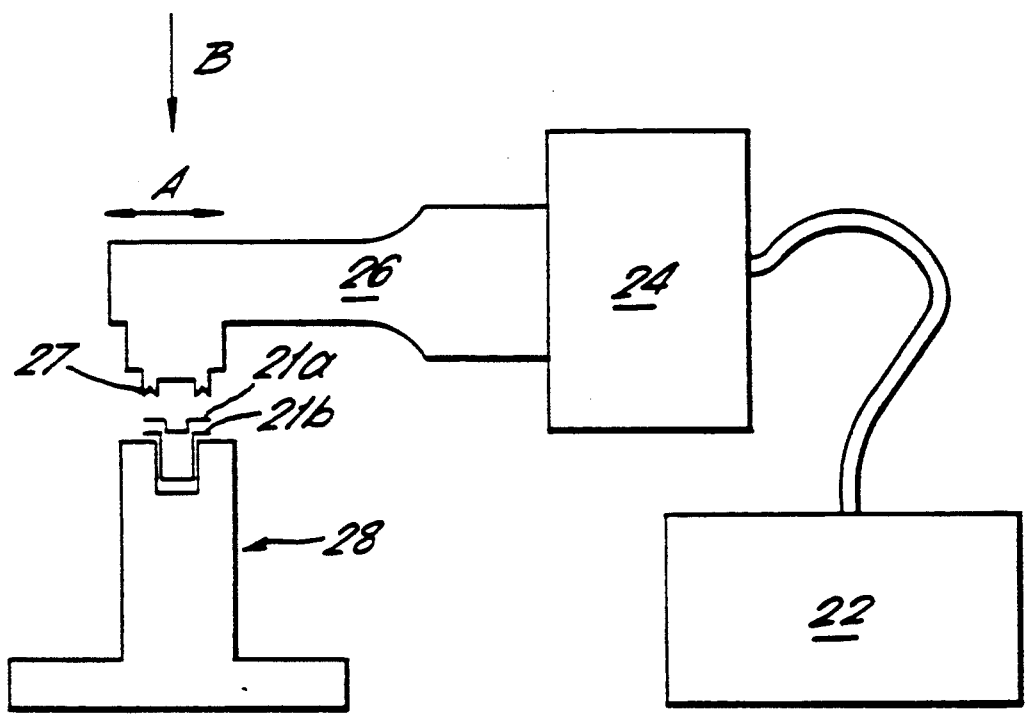

The invention will now be described by way of example only and with reference to the accompanying drawings, in which:

FIG. 1 is a perspective view of a known sodium/sulphur cell with part broken away;

FIG. 2 diagrammatically illustrates the connection between the case and the closure member of the cell of FIG. 1;

FIG. 3 diagrammatically illustrates a sodium/sulphur cell closed by the method of the present invention;

FIG. 4 schematically shows an apparatus for ultrasonically welding together the case and the closure member of the sodium/sulphur cell of FIG. 3; and FIGS. 5 and 6 diagrammatically illustrate further embodiments of sodium/sulphur cells closed by the method of the present invention.

FIG. 1 has been fully described above and will not therefore be described again.

Referring now to FIG. 2, this illustrates the conventional way of securing the closure member 6 to the case 1 of the cell. The closure member 6 has an upstanding peripheral flange 9 which is secured inside the case 1 by electron beam welding, laser welding or TIG welding as discussed above.

Referring now to FIG. 3, this illustrates the connection of a closure member 16 to a case 11 by the method of this invention. As shown, an outwardly extending annular flange 20 is formed at the open end of the case 11, and the closure member 16 is formed to extend over the flange 20 and is secured thereto by ultrasonic welding. The other parts of the sodium/sulphur cell of FIG. 3 are similar to parts of the sodium/sulphur cell of FIGS. 1 and 2 and accordingly corresponding reference numerals are used for corresponding parts.

Each of the case 11 and closure member 16 is formed of a composite material consisting of a steel substrate with a layer of a deformable metal, such as aluminium or an alumunium alloy, mechanically fixed to the substrate. The weld between the case 11 and the closure member 16 is formed on a diameter greater than the diameter of the case 11 and is of annular form. As can be seen in FIG. 3, the weld is formed away from the part of the cell containing the electrode materials and so any damage or weakening of the composite material of the case 11 or closure member 16 caused by the welding process is not exacerbated by corrosive attack by the electrode materials.

The weld or bond between the case 11 and the closure member 16 is a solid phase bond produced by a method of solid phase bonding such as diffusion bonding (thermocompression), ultrasonic welding or cold welding. An apparatus for ultrasonically welding together the flange 20 of the case 11 and the closure member 16 is shown in FIG. 4.

The two members to be ultrasonically welded together, the workpiece, are shown at 21 as two components 21a, 21b. A frequency generator 22, which can produce an output of between 10 and 36 kHz is used to produce a high frequency output signal at the desired frequency. This signal is coupled to a piezoelectric crystal 24 which responds by delivering a small amount of movement at a similar frequency to the applied signal. The movement is transmitted to the workpiece 21 by means of a sonotrode 26. The annular sonotrode 26 is of the required size and made of hardened steel, titanium or some other suitable material and is shaped so that the ultrasonic movement (direction indicated by the arrow A) is amplified and then focused ar the desired position. The ultrasonic movement is transmitted to the top component 21a by serrations 27 in the sonotrode 26. As the welding load (indicated by the arrow B) is applied to the workpiece 21 the serrations 27 in the surface of the sonotrode embed themselves into the material so transmitting ultrasonic movement to the top component 21a. The bottom component 21b is located on a support 28. The serrations (not shown) of the support 28 fix the bottom component 21b in position so that relative movement can take place between the top and bottom components 21a, 21b during welding. The present apparatus uses a lateral driven sonotrode so that the movement of the welding tip relative to the weld interface is non-torsional with only a translational ultrasonic movement being used to generate the weld.

The formation of annular welds is described in "Metals Joining Manual" by M. M. Schwartz published by McGraw-Hill Book Company. However, previous proposals as described utilise a torsional driven coupling arrangement to produce a torsional vibrating displacement of the welding tip (serrations) in a plane parallel to the weld interface (between the top and bottom components). As compared with the non-torsional method described above, the prior art proposals have the disadvantage of requiring a relatively high energy level to produce the weld due to torsional losses.

Alternatively, a sonotrode may be used as a continuous seam welder in which the welding tip is positioned adjacent the top component and the workpiece is rotated relative to the sonotrode.

As shown in FIG. 4, the top component 21a consists of the closure member 16 of the sodium/sulphur cell while the bottom component 21b consists of the annular flange 20 of the case 11. Because the closure member 16 is welded to the flange 20 of the case 11, the welding load can be applied as an axial pressure. As compared with the application of pressure radially, the application of pressure axially has the advantage of simplicity.

The combination of the position of the weld and the solid phase bond produced by the method according to the present invention enables the provision of a hermetic bond between the case and closure member of the sodium/sulphur cell.

Although as shown in FIG. 3 the flange 20 extends substantially perpendicularly to the wall of the case 11, it will be appreciated that it can otherwise extend at any other suitable angle in dependence on the welding tool to be used.

As shown in FIG. 5, after formation of the weld as shown in FIG. 3, the flange 20 and the part of the closure member 16 secured thereto can be bent to extend about the outside of the case 11 with the free edges of the flange 20 and the closure member 16 directed away from the end of the case 11 closed by the closure member 16, thereby to reduce the maximum overall diameter of the cell.

Further, as shown in FIG. 6, the wall of the case 11 can be kinked inwardly, as shown at 31, in order that the maximum overall diameter of the cell is no more than the basic diameter of the case 11.

The flange 20 of the case 11, the corresponding part of the closure member 16 and the kink 31 in the wall of the case 11 (as shown in FIG. 6) can be produced during formation of the case 11 and closure member 16 by methods known to those skilled in the art.

It is envisaged the case and closure member could be formed of a composite material in which the substrate was formed of a material such as aluminium with ceramic reinforcing fibres.

Modifications to the embodiments described and within the scope of the present invention will be apparent to those skilled in the art.

I claim:

1. A method of closing one end of the case of a sodium/sulphur cell, each of the case and the closure member being formed of a composite material consisting of a substrate and a deformable metal layer mechanically fixed to said substrate, the substrate being formed of a material which is harder than said deformable metal, the method comprising the steps of forming an outwardly extending annular flange at the said one end of the case and securing the closure member to the annular flange at interfacing surfaces thereof with the deformable metal layer being at said interfacing surfaces by a solid phase bond, thereby to close the case.

2. A method according to claim 1, further comprising the step of bending the annular flange and the part of the closure member secured thereto to extend about the outside of the case with the free edges of the annular flange and the closure member directed away from said one end of the case closed by the closure member.

3. A method according to claim 1, further comprising the step of forming the case to be kinked inwardly below the position of the free edges of the annular flange and the closure member such that the overall diameter of the cell is no more than the basic diameter of the case.

4. A method according to claim 2, further comprising the step of forming the case to be kinked inwardly below the position of the free edges of the annular flange and the closure member such that the overall diameter of the cell is no more than the basic diameter of the case.

5. A method according to any one of claims 1, 2, 3 or 4 wherein said solid phase bond is formed by ultrasonic welding.

6. A sodium/sulphur cell including a case closed at one end by a closure member, each of the case and the closure member being formed of a composite material consisting of a substrate and a deformable metal layer mechanically fixed to said substrate, the substrate being formed of a material which is harder than the deformable metal, wherein said one end of the case is formed to include an outwardly extending annular flange and the closure member is secured to said annular flange at interfacing surfaces thereof with the deformable metal layer being at said interfacing surfaces by a solid phase bond.

7. A sodium/sulphur cell according to claim 6 wherein said substrate is formed of a metal.

8. A sodium/sulphur cell according to claim 6 wherein said annular flange and the part of the closure member secured thereto are bent to extend about the outside of the case with the free edges of the annular flange and the closure member directed away from said one end of the case closed by the closure member.

9. A sodium/sulphur cell according to claim 7 wherein said annular flange and the part of the closure member secured thereto are bent to extend about the outside of the case with the free edges of the annular flange and the closure member directed away from said one end of the case closed by the closure member.

10. A sodium/sulphur cell according to any one of claims 6, 7, 8 or 9 wherein the case is kinked inwardly below the position of the free edges of the annular flange and the closure member such that the overall diameter of the cell is no more than the basic diameter of the case.

* * * * *